US009547409B2

(12) United States Patent
Huang

(10) Patent No.: US 9,547,409 B2
(45) Date of Patent: Jan. 17, 2017

(54) NAVIGABLE GRAPH OF A SERVICE LEVEL MANAGEMENT DOCUMENT

(71) Applicant: CA, Inc., Islandia, NY (US)

(72) Inventor: Ai Huang, Beijing (CN)

(73) Assignee: CA, Inc., Islandia, NY (US)

( * ) Notice: Subject to any disclaimer, the term of this patent is extended or adjusted under 35 U.S.C. 154(b) by 773 days.

(21) Appl. No.: 13/682,963

(22) Filed: Nov. 21, 2012

(65) Prior Publication Data

US 2014/0143736 A1    May 22, 2014

(51) Int. Cl.
| G06Q 10/06 | (2012.01) |
| G06F 3/0481 | (2013.01) |
| G06F 17/30 | (2006.01) |
| G06T 11/20 | (2006.01) |

(52) U.S. Cl.
CPC ....... *G06F 3/0481* (2013.01); *G06F 17/30958* (2013.01); *G06F 17/30961* (2013.01); *G06Q 10/06* (2013.01); *G06Q 10/0637* (2013.01); *G06T 11/206* (2013.01)

(58) Field of Classification Search
CPC .............. G06F 3/0481; G06F 17/30958; G06F 17/30961; G06T 11/206; G06Q 10/0637; G06Q 10/06
See application file for complete search history.

(56) References Cited

U.S. PATENT DOCUMENTS

| 6,219,053 | B1 * | 4/2001 | Tachibana et al. | 715/835 |
| 7,702,487 | B2 * | 4/2010 | Sherrill et al. | 702/188 |
| 2006/0111953 | A1 * | 5/2006 | Setya | 705/8 |
| 2006/0242604 | A1 * | 10/2006 | Wong et al. | 715/854 |
| 2008/0240119 | A1 * | 10/2008 | Wylie et al. | 370/400 |
| 2009/0240723 | A1 * | 9/2009 | Engle et al. | 707/102 |
| 2011/0214080 | A1 * | 9/2011 | Agrawal et al. | 715/771 |

* cited by examiner

*Primary Examiner* — Amy Ng
*Assistant Examiner* — Sajeda Muhebbullah
(74) *Attorney, Agent, or Firm* — Stevens & Showalter, LLP

(57) ABSTRACT

A service level management document is modeled by a multi-path, navigable graph. The graph is comprised of nodes connected by lines where each node represents part of a modeled service level management document and each line represents the relationship between connected nodes. Each node has a predetermined shape that corresponds to the role of each node in the graph, such as by designating whether the node is a root node, branch node, leaf node, or branch graph node. Moreover, the shape can distinguish whether the node is optional or required. The background color of each node is indicative of the state of the information within a configuration page linked to a corresponding node. The configuration pages of a graph collectively describe the content of the modeled service level management document.

30 Claims, 11 Drawing Sheets

402 MAIN | 404A BASIC | CONTRACTUAL SECTION | 404B FINANCIAL SECTION | 404C | 404D ALERTS | CONTRACTS NAVIGATOR | 404E
OPERATIONAL SECTION | ALL METRICS

420 GENERAL

424

CONTRACT
NAME: *  AAA
CONTRACT TYPE:  SERVICE LEVEL AGREEMENT
STATUS:  PRELIMINARY
EFFECTIVE: *  MM/DD/YYYY 00:00 TO MM/DD/YYYY 00:00 FOLLOWING CONTRACT TIME ZONE
PRIMARY CONTRACT PARTY:  XYZ
SERVICES: *  ACQUISITION

VERSION
VERSION  1 OF 1 (PRELIMINARY)  [CHANGE VERSION]
EFFECTIVE: *  MM/DD/YYYY 00:00 TO MM/DD/YYYY 00:00 FOLLOWING CONTRACT TIME ZONE

DETAILS
TIME ZONE: *  CET
CURRENCY:  EURO
FEE:  0 PER MONTH
SEATS:
OWNER:

422
[COMMIT] [APPLY] [SAVE] [CANCEL] [DELETE] [ADD TO FAVORITES]

EXCEPTION DETAILS

NAME: *
DESCRIPTION:

JUSTIFICATION: *

EXCEPTION TIME -

TIMESLOT: * WEEKLY ▶ EDIT TIMESLOT

TIME RANGE: M/D/YYYY HH:MM TO M/D/YYYY HH:MM

TIME ZONE: * CDT ▶

CONTRACT PARTIES AND/OR CONTRACTS: *

INCLUDED CONTRACT PARTIES | AVAILABLE CONTRACT PARTIES

INCLUDED CONTRACTS | AVAILABLE CONTRACTS

RESTRICT TO | AVAILABLE

RESTRICT TO | AVAILABLE

DOMAIN CATEGORIES:

SERVICES:

[ COMMIT ] [ APPLY ] [ SAVE ] [ CANCEL ] [ DELETE ] [ ADD TO FAVORITES ]

Tabs: MAIN | BASIC | CONTRACTUAL SECTION | FINANCIAL SECTION | ALERTS | CONTRACTS NAVIGATOR | ALL METRICS
PARAMETERS | NOTES | TIMESLOTS | AUDIT TRAIL | DIAGNOSE | EXCEPTIONS | OPERATIONAL SECTION | ATTACHMENTS

FIG. 6

NAVIGABLE GRAPH OF A SERVICE LEVEL MANAGEMENT DOCUMENT

BACKGROUND

The present disclosure relates to service level management, and in particular to systems, methods and computer program products for summarizing service level management documents in a multi-path, navigable graphical representation.

A distributed enterprise computing system allows different individual applications, services, or other components to interoperate, thus allowing an enterprise to quickly build and deploy business applications. In order to ensure that transactions in a distributed enterprise computing system are performed in a timely manner, service level agreements are typically established between a software service provider and a customer. A service level agreement is part of a service contract that formally defines the quality of service, e.g., level of performance, delivery time, etc., expected by the interoperating components under a given set of circumstances.

As such, a software service provider typically manages a service utilized by a customer based upon the terms of a service level agreement. In certain systems, a large number of service level agreements must be managed. For instance, some applications require the management of hundreds of service level agreements.

BRIEF SUMMARY

According to various aspects of the present disclosure, a service level management document is represented as a multi-path, navigable graph. The graph is created by receiving a request from a user to create a multi-path, navigable graph that represents a corresponding service level management document. In response thereto, the graph is created by generating a root node, and by assigning the root node to the graph. The service level management document is further represented by inserting the root node into a viewable representation of the graph and by associating a predetermined root node configuration page with the root node. The root node configuration page stores information characterizing root level information of the service level management document.

Still further, the service level management document is represented by adding at least one additional node to the graph. Each node is added by identifying, based on user input, a node within the viewable representation of the graph, by building a list of each candidate branch node if there is at least one candidate branch node associated with the identified node and by selecting, based on user input, a candidate branch node from the list if there is at least one candidate branch node associated with the identified node.

The selected branch node is then generated by assigning the selected branch node to the graph as a branch of the node identified by the user, by inserting the selected branch node into the viewable representation of the graph and by associating a predetermined branch node configuration page with the selected branch node, where the branch node configuration page is provided for storing information characterizing a particular predetermined section of the service level management document.

BRIEF DESCRIPTION OF THE DRAWINGS

FIG. 4 is an illustrative screen shot of an exemplary tabbed graphical user interface for entering service level management document information into a computer system, according to various aspects of the present disclosure;

FIG. 6 is a is an illustrative screen shot of an exemplary tabbed graphical user interface for entering service level management document information into a computer system, according to still further aspects of the present disclosure;

DETAILED DESCRIPTION

Figure 1:
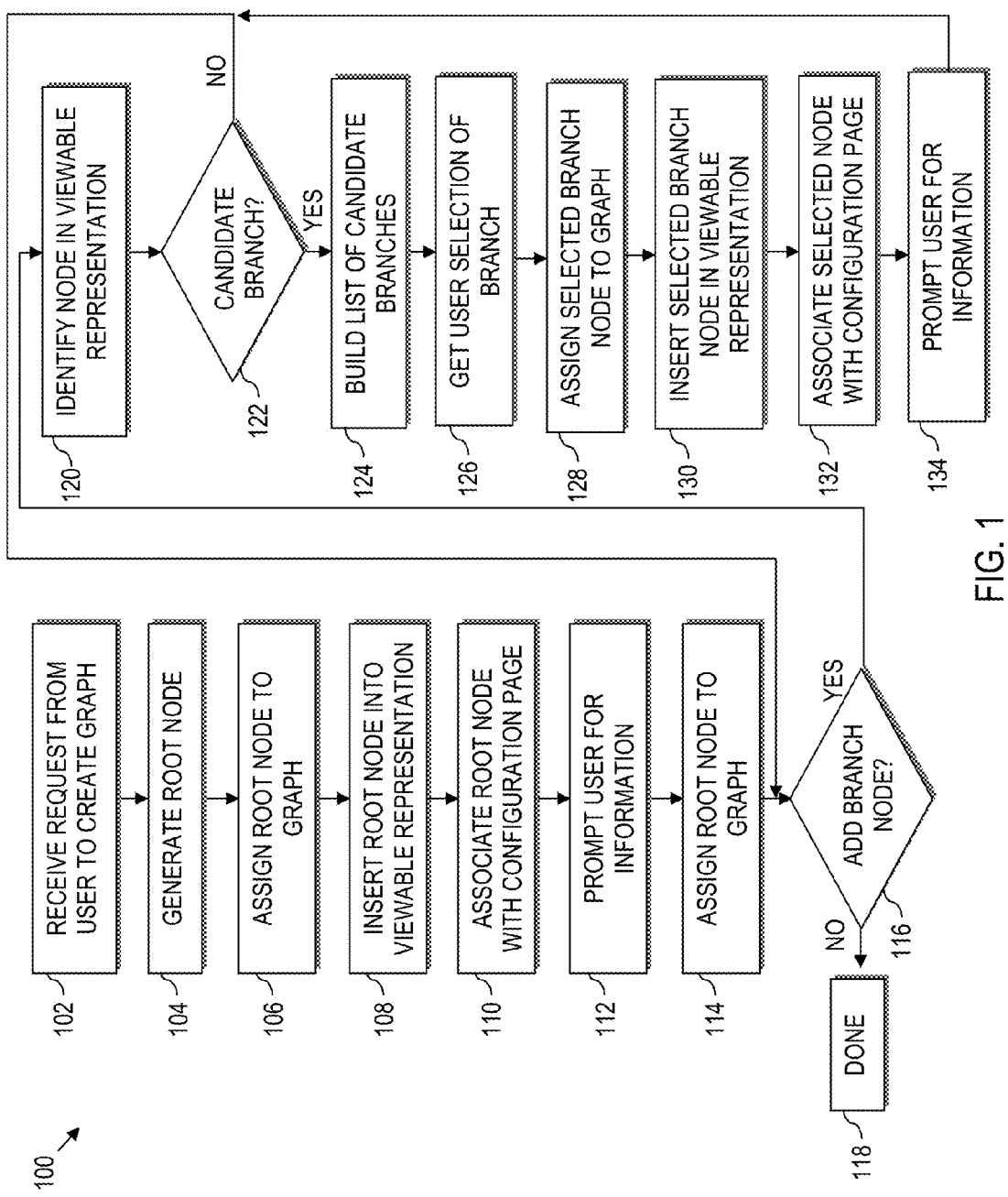
FIG. 1 is a flow chart illustrating a method of representing a service level management document as a graph, according to aspects of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CORaM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, CII, VB.NET, Python or the like, conventional procedural programming languages, such as the "c" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

According to various aspects of the present disclosure, a graphical environment is provided that models or otherwise characterizes service level management documents as multi-path, navigable graphical representations. Each graph is composed of lines and nodes where each node represents a part of one document and each line represents the relationship between two nodes connected by the line.

A graph summarizes a corresponding service level management document providing a fast and efficient way to browse, create and modify service level management documents. For instance, a graph provides in a single view, a graphical representation of the sections of a modeled document and simultaneously provides information indicative of whether each section includes configuration information that is complete, incomplete, modified, etc. Moreover, each node of a graph can have a predetermined shape that corresponds to the role of each node in the graph, such as by designating whether the node is a root node, branch node, leaf node, or branch graph node. The shape can also distinguish whether the node is optional or required to model a corresponding service level management document. Thus, each node can serve as a predetermined building block that allows a user to link together various combinations of nodes to model an associated service level management document.

Accordingly, a data modeling and analysis environment is provided that improves the management of service level management documents, as will be described in greater detail herein.

Referring now to the drawings and in particular to FIG. 1, a flow chart illustrates a method 100 of representing a service level management document as a graph. The method comprises receiving a request from a user to create the graph at 102. The graph comprises a multi-path layout that follows a tree-like, hierarchical structure that models the structure of a corresponding service level management document. The multi-path (hierarchical) structure allows the service level management document to be graphically represented by different levels, layers, views and other logical organizations.

Moreover, the graph is a navigable graph that represents the contents of a corresponding service level management document in such a way that a user can interact with a graphical user interface to view and move through the different graphical elements of the graph and thus, to move through different components of the corresponding service level management document. Still further, the user can view and move through multiple graphs, each representing a separate service level management document. In this manner, individual documents can be quickly and easily reviewed and collections of service level management documents can be quickly reviewed.

More particularly, the method 100 comprises generating a first node at 104, which is designated as a root node and assigning the root node to the graph at 106. The method 100 also comprises inserting the root node into a viewable representation of the graph at 108. As used herein, the viewable representation is that portion of a graph that is viewable in a single display area, e.g., a display window or panel. Various examples of viewable representations will be described in greater detail herein.

The method also comprises associating a predetermined root node configuration page with the root node at 110. The root node configuration page stores information characterizing root level information of the service level management document being modeled. The method 100 may further comprise prompting the user to provide information required by the root node configuration page at 112.

The method still further comprises adding at least one additional node to the graph. Each added node corresponds to a section of the document being modeled. For instance, a decision is made at 116 as to whether a branch node should be added, e.g., to summarize a different part of the modeled document. If the decision result is No, e.g., meaning that there are no additional nodes to be added to the graphical representation, then the method 100 is complete at 118. On the other hand, if the user desires to add an additional branch node, the method 100 continues to allow the creation of a new node that describes a section, portion, page, etc. of the underlying service level management document.

As an illustrative example, the method 100 comprises identifying, based upon user input, a node within the viewable representation of the graph at 120. A determination is made at 122 as to whether there is at least one candidate branch node associated with the identified node, where each candidate branch node hierarchically branches from the identified node. That is, each node is a building block to model the document. As such, each node may have zero or more child nodes that can be added to the graph. Some nodes may be optional and thus not required to model all documents. Accordingly, the available child nodes (also referred to herein as branch or leaf nodes) are referred to as candidate nodes to further clarify their optional status.

The method 100 further includes building a list of each candidate branch node if there is at least one candidate branch node associated with the identified node at 124 and selecting, based upon user input, a candidate branch node from the list at 126 if there is at least one candidate branch node associated with the identified node. In this way, the user can build a graph that models an underlying document, but do so with a constrained set of predetermined nodes that each serve as a building block of the graph.

The method 100 generates the selected branch node by assigning the selected branch node to the graph at 128 as a branch of the node identified by the user and by inserting the selected branch node into the viewable representation of the graph at 130. The method 100 further includes associating a predetermined branch node configuration page with the selected branch node at 132, where the branch node configuration page stores information characterizing a particular predetermined section of the service level management document that is represented by the node. Still further, the method 100 may include prompting the user to provide information required by the branch node configuration page at 134.

The method 100 may be implemented, for instance, as a computer readable storage media comprising computer instructions that instruct a processor to implement the described method. For instance, the computer code may execute a graphical user interface that allows a user to review, create or modify graphs of service level documents within a graphical environment. The graphical environment may contain pre-configured document "sections" where each section corresponds to a graphical representation represented as a node (or candidate node) of a graph. Alternatively, the method may allow a user to completely customize the content of the service level document represented by the graph, e.g., by building custom nodes and corresponding configuration pages.

By way of example, service level agreements represent a class of service level management documents that are frequently encountered in business applications. In certain applications, it is not uncommon for a user to be charged with the responsibility to manage hundreds of service level contracts. In this regard, the management of service level contracts is conventionally a largely manual process whereby a user creates, modifies and reviews service level documents, one at a time. Given a large number of service level contracts, it is possible that certain parts of a given service level contract are incomplete or not properly completed.

While service level agreements have different terms, conditions, performance metrics, etc., this document type can be broken down into predefined sections that generically classify the type of information that is required to build a particular service level agreement.

Figure 2:
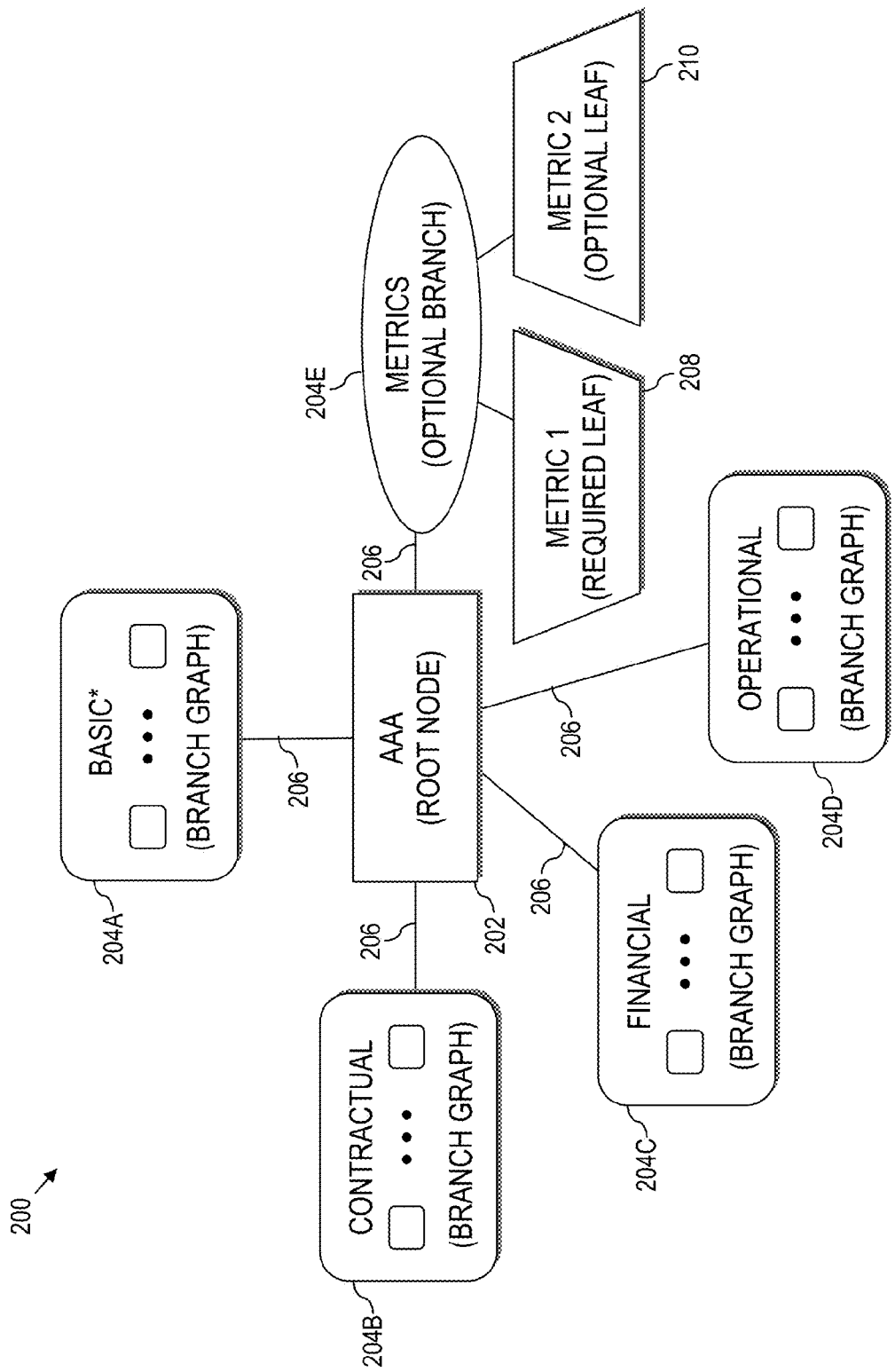
FIG. 2 is a diagram illustrating a graph of an exemplary service level document according to certain aspects of the present disclosure.

Referring now to FIG. 2, a diagram illustrates a graph 200 of an exemplary service level management document according to certain aspects of the present disclosure. The graph 200 may represent a service level agreement in a working environment that executes a service level management solution such as Business Service Insight by CA Technologies of Islandia N.Y. The working environment can include tools to manage and store service level management documents, and may further include automated service level monitoring tools to monitor service level agreement documents. In this example, the method 100 of FIG. 1 can execute as a component of the service level management solution.

As illustrated, the graph 200 is a tree view that includes a root node 202 and one or more additional nodes, which are represented as additional nodes 204. A line connects nodes in a hierarchical organization. In this manner, there are multiple paths that branch out from the root node 202. As used herein, any node that extends from another node (i.e., the child of a corresponding parent node) is referred to herein as a branch node. If a branch node represents the end of a path (i.e., there are no child nodes) then that node is also referred to herein as a leaf node.

The exemplary graph 200 represents a service level agreement that includes contract clauses that are typically associated with such service level agreements. The overall service level agreement is logically organized into a plurality of sections where each section represents a part of the underlying service level document and is represented by a root node 202 and branch nodes 204. A line 206 represents the relationship between two nodes that the line connects. In this regard, each node 202, 204 may represent a contract clause, obligation section, metric, general information, background section, metadata section or other part of the service level agreement. Regardless of how the content of the service level management document is broken up, each graph includes at least one root node and at least one branch node.

Moreover, aspects of the present disclosure are particularly applicable to applications that implement different types, categories, styles, etc. of documents. For instance, a company may manage hundreds of service level agreements, but each service level agreement may include the same or similar types of information, which can be categorically, logically or otherwise organized, as illustrated by the categorizations of each node 202, 204 in FIG. 2. Additionally, documents may be organized into categories that require certain types of data, but that also allow for other, optional data.

In an illustrative implementation, a graph is comprised of nodes, which are logically organized into six different node types. The different node types include a root node, a required branch node, a required leaf node, an optional branch node, an optional leaf node and a branch graph node. Using these node types, documents can be quickly modeled. In an illustrative implementation, each graph is required to have a single root node and at least one branch node. A required branch node is a branch node that is required for a specific document type. A required leaf node is simply a required branch node that has no children. An optional branch node is a branch node that is not required, but that may be utilized to represent certain types of optional data, such as data that is not required for all documents of a certain document type. Alternatively, an optional branch may represent data that is not required to be filled in/provided for the document to be considered complete. An optional leaf node is an optional branch node that has no children. A branch graph node is a branch node, such as a required branch node, a required leaf node, an optional branch node or an optional leaf node that has one or more child nodes that are collapsed into the branch node shape so that the child node(s) are not themselves, in a viewable representation of the graph.

Each node type is distinguished in the graph 200 by using some form of distinguishable indicia, such as by using a different shaped box alone or in combination with further indicia for each node type. Other indicia may alternatively be used to distinguish node types.

In the illustrative implementation, the graph 200 summarizes a corresponding service level management document across multiple different dimensions so as to provide a significant amount of information in a condensed graphical representation. For instance, every graph 200 includes a single root node 202. As illustrated, the root node 202 includes a text box that displays the name (or alternatively, an abbreviation or other representation of a name) of a corresponding service level management document. For instance, the graph 200 of FIG. 2 represents contract named AAA. There are a plurality of branch nodes that extend out from the root node, each including a label corresponding to the role of the node in the graph. The nodes include a Basic node 204A, a Contractual node 204B, a Financial node 204C, an Operational node 204D and a Metrics Node 204E. The Basic node 204A, Contractual node 204B, Financial node 204C and Operational node 204D are each also branch graph nodes. The branch nodes 204 each have a shape that is distinguished from the root node 202.

A branch graph node includes some indicia indicating that there is at least one child node hidden from the viewable representation of the graph 200. For instance, by knowing that the Basic node 202A is a branch graph node, the user also knows that there is at least one child node of the Basic node 204A. That is, a branch graph node provides a way to collapse a hierarchical portion of the graph 200 into a single symbol. In this regard, the entire service level management document can be organized and displayed in a single viewable representation using a limited number of graphical symbols to represent the entire graph. Thus, even complex graphs with numerous nodes can be represented in a relatively simple visual display. If the user wishes to see additional/alternative levels of detail, the user may drive into the graph.

The Basic node 204A is a branch graph node, as illustrated by its shape. The Branch node 204A also optionally includes some indicia, e.g., an asterisk as illustrated, to represent that the Basic node 204A is also a required node. That is, the basic node 204A (or a branch/leaf node hierarchically below the Basic Node 204A) is linked or otherwise associated with a configuration page that stores information characterizing information required by the underlying service level management document. The branch graph node may also contain indicia that indicates the number of child nodes, e.g., using a symbol for each child node. For instance, the Basic Node 204A includes two box icons separated by an ellipsis indicating that there are more than two children. Any other visual representation may alternatively be used. Still further, no visual indication of the number of child nodes is required.

The Contractual node 204B, the Financial node 204C and Operational node 204D are each optional branch graph nodes (note no asterisk is provided), indicating that each has at least one child/branch node thereunder. The Metrics branch 204E is illustrated as an optional branch, as differentiated from the root node 202 and branch graph nodes 204A, 204B, 204C and 204D by its differing shape. The Metrics branch 204E is not illustrated as a branch graph node in FIG. 2 because its only two branch/child nodes are expanded out so as to be in the viewable representation. Note that the Metrics node 204E does not include an asterisk indicating that it is required despite having a required leaf node 208 thereunder. This indicates that a Metrics node 204E is not required by the root node 202. However, if a Metrics node 204E is added to the graph, then the Metrics node 204E must include at least the required leaf node 208 (designated as Metric 1) and zero or more optional leaves, e.g., the optional leaf node 210 (designated Metric 2). The required leaf node 208 and the optional leaf node 210 are each identified within the viewable representation by a different graphic symbol to visually distinguish the node type.

Of course, additional, fewer or alternative node types may be implemented, depending upon the particular implementation. Also, shape or other distinguishing indicia may be utilized, depending upon the implementation.

Figure 3:
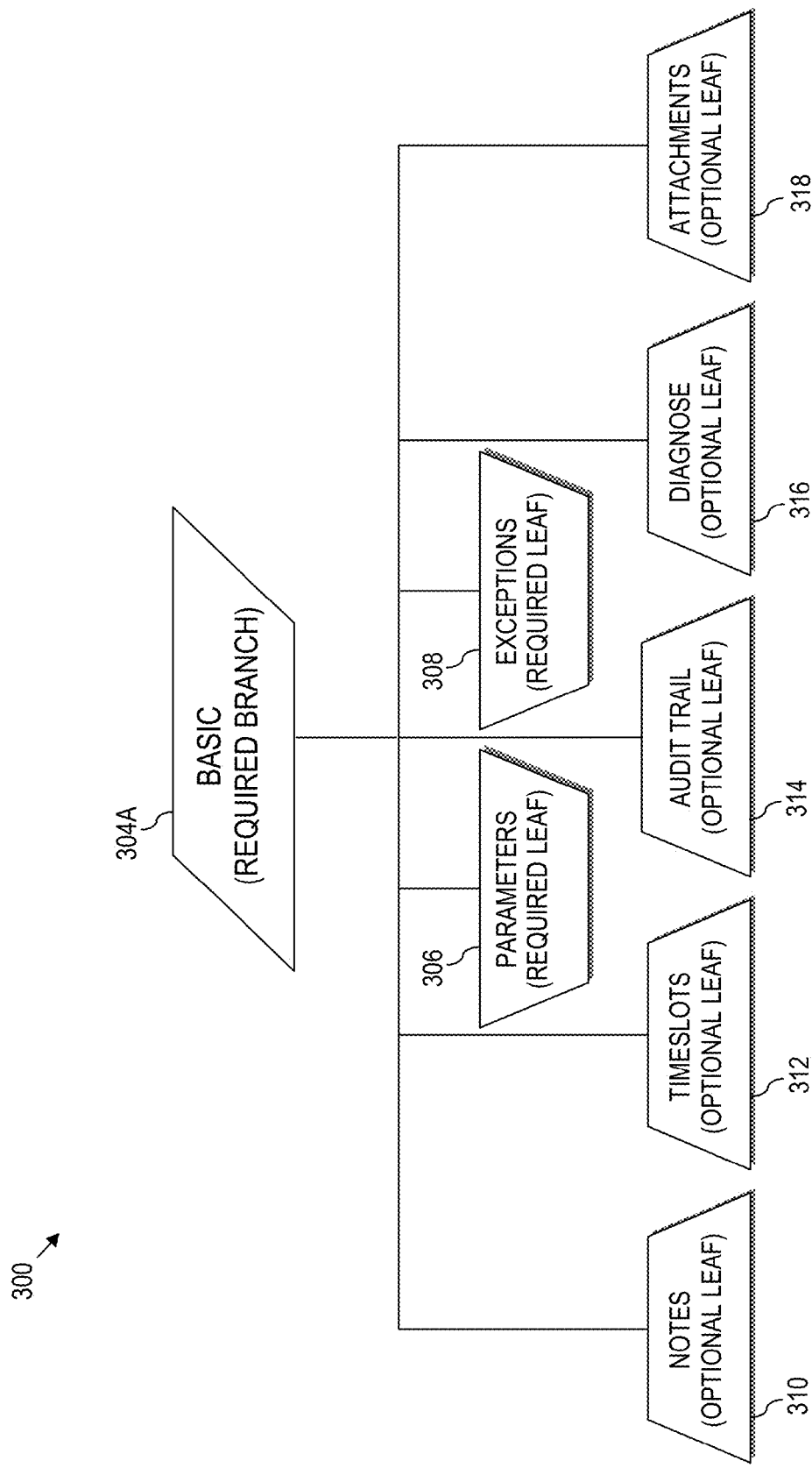
FIG. 3 is a hierarchical structure of required an optional components of a service level management document, according to certain aspects of the present disclosure.

Referring to FIG. 3, a hierarchical structure 300 of components of a service level management document are illustrated, according to certain aspects of the present disclosure. A Basic node 304A represents a required branch node type. The hierarchical structure 300 is an expanded view of the Basic graph node 204A of FIG. 2. For purposes of example, there are seven leaf nodes hierarchically under the Basic node 304A. These leaf nodes include a first required leaf node 306 (designated for parameters) and a second required leaf node 308 (designated for exceptions). There are also five optional leaf nodes including a first optional leaf node 310 (designated for "notes"), a second optional leaf node 312 (designated for "timeslots"), a third optional leaf node 314 (designated for an "audit trail"), a fourth optional leaf node 316 (designated for "diagnosis") and a fifth optional leaf node 318 (designated for "attachments"). The illustrated nodes are by way of illustration and not limiting herein.

Referring to FIG. 4, a screen shot illustrates an exemplary tabbed graphical user interface 400 for entering service level management document information into a computer system, according to various aspects of the present disclosure. The graphical user interface comprises a tabbed menu system that includes a series of tabs that correspond with the nodes of a corresponding graph. For instance, the tabs illustrated in the interface 400 correspond to the nodes of FIG. 2. In particular, the interface includes a main tab 402 that corresponds to the root node 202 of FIG. 2. The Basic tab 404A corresponds to the Basic node 204A. The Contractual section tab 404B corresponds to the Contractual node 204B. The Financial section tab 404C corresponds to the Financial node 204C. The Operational section tab 404D corresponds to the Operational node 204D and the All Metrics tab corresponds to the Metrics node 204E.

As noted above, the root node 202 of FIG. 2 is associated with a predetermined root node configuration page, an example of which is illustrated in the General tab, which is a sub-tab under the Main tab 402. The root node configuration page (General tab) stores information characterizing root level information of the service level management document, such as basic information related to the parties of the service level agreement, the version of the software level agreement, etc. The interface also includes menu options 422 across the bottom of the interface to commit the user-entered data to a corresponding environment, to apply the changes, save, cancel, delete or add to favorites. Still further, the interface 400 includes an icon to switch views to a contracts navigator, which is used to build and navigate graphs, such as the graph of FIG. 2. The contracts navigator is described in greater detail herein.

Figure 5:
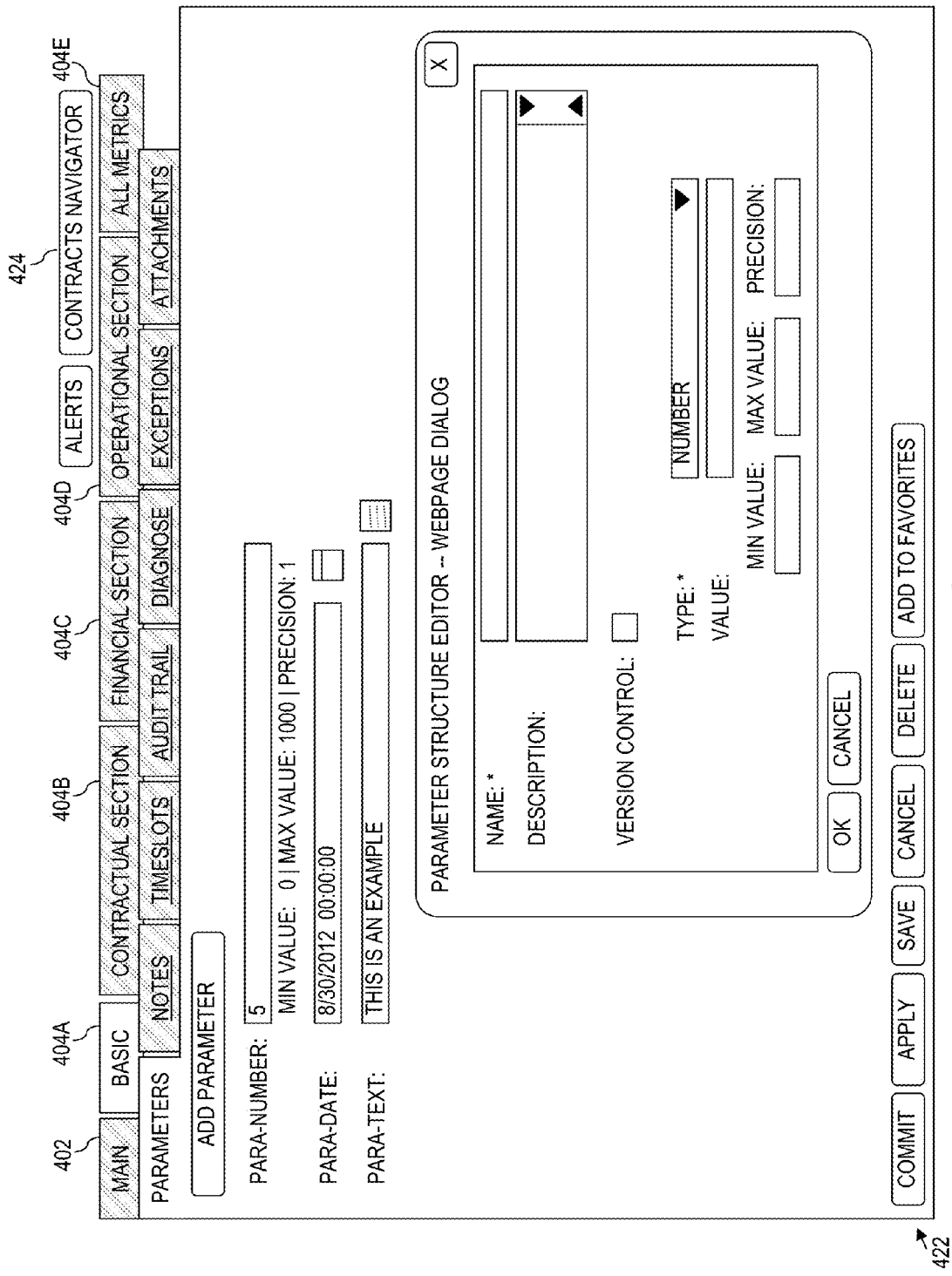
FIG. 5 is a is an illustrative screen shot of an exemplary tabbed graphical user interface for entering service level management document information into a computer system, according to further aspects of the present disclosure.

Referring to FIG. 5, an illustrative screen shot of the exemplary tabbed graphical user interface 400 of FIG. 4 is illustrated, where the Basic tab 404A has been selected. As noted with reference to FIG. 3, the exemplary Basic node 304A includes seven leaf nodes 306-318. Referring back to FIG. 5, each of the leaf nodes 306-318 has a corresponding sub-tab in the interface 400. Each sub-tab provides a configuration page comprised of fields to collect information that is specific to the particular service level management document being modeled by the graph. The Parameters leaf node 306 of FIG. 3 is designated as a required leaf node. Correspondingly, in FIG. 5, the Parameters sub-tab under the Basic tab includes fields that include an asterisk to indicate that the field is a required field as well as fields that are optional.

Referring to FIG. 6, an illustrative screen shot of the exemplary tabbed graphical user interface 400 of FIG. 4 is illustrated, according to still further aspects of the present disclosure. The interface is illustrated, where the user has selected the Exceptions sub-tab under the Basic tab. The Exceptions sub-tab illustrates an exemplary configuration page that is split across multiple panels, selected using the panel selector 426.

The illustrated tabs and sub-tabs are merely illustrative and are not intended to be limiting. Rather, the examples are provided to demonstrate the association between graph nodes and their corresponding configuration pages. Each configuration page may include required data, optional data, or a combination of required and optional data. Further, the configuration pages may actually span across multiple panels. As such, the term "configuration page" is used to refer to a collection of information that links a node to a portion of a corresponding service level management document and is not limited to content that fits on a single viewable page.

Figure 7:
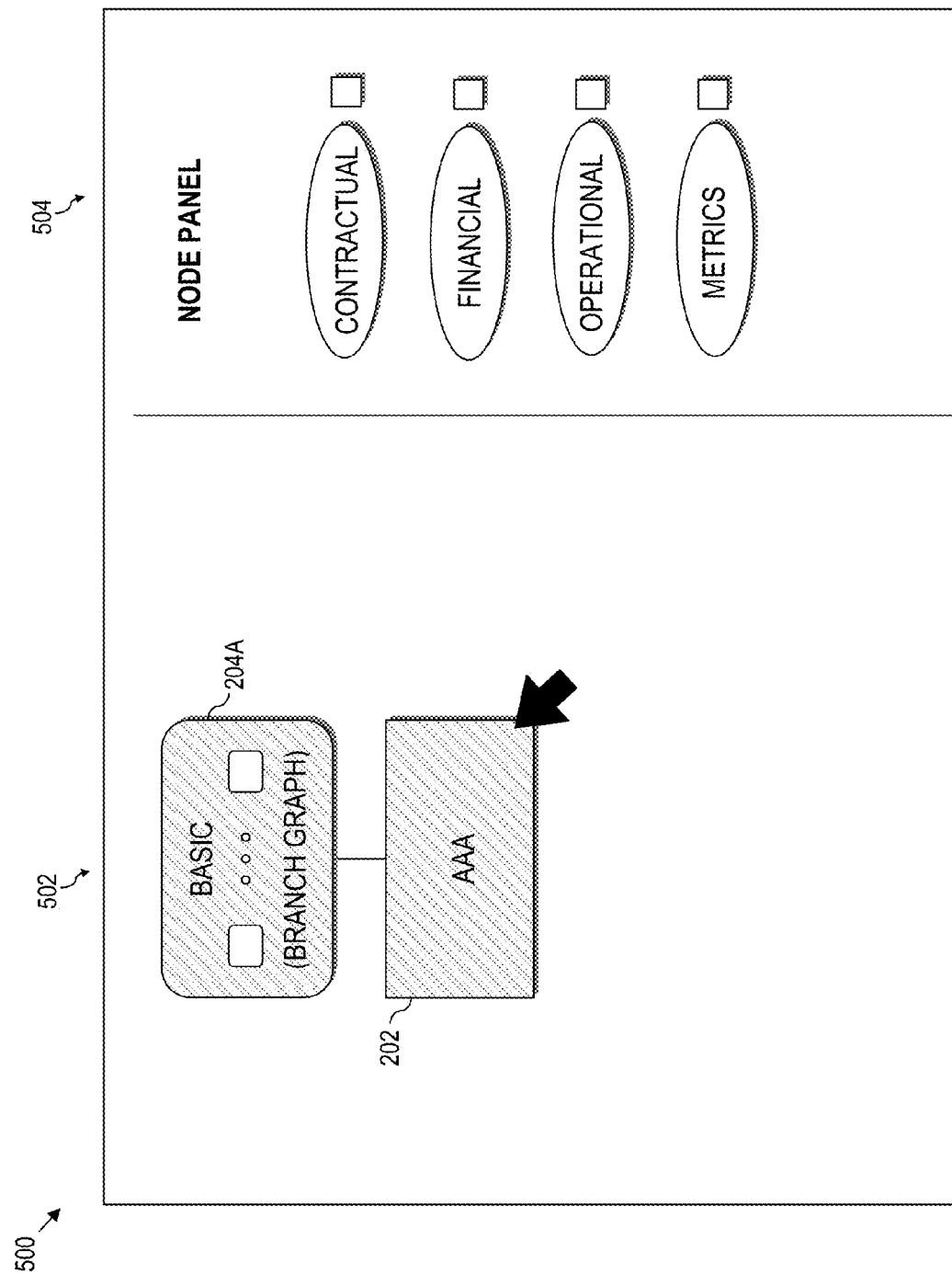
FIG. 7 is a graphical user interface for building a graph of a service level management document, according to aspects of the present disclosure.

Referring to FIG. 7, a graphical user interface 500 is provided for building a graph of a service level management document, according to aspects of the present disclosure. The graphical user interface provides a framework for data modeling and analysis of service level documents and can be utilized to implement the contracts navigator. Moreover, the interface can be used to implement the method 100 of FIG. 1. The user starts by building a graph that models a corresponding service level management document.

The user interface 500, e.g., the contracts navigator, includes two panels, including a viewable representation panel 502 and a node panel 504. The viewable representation panel 502 provides a view of a graph. The viewable representation panel 502 defines a graphical environment to create a graph, and to navigate between the graph and the linking configuration page of each node. In this regard, a graph may be built from scratch concomitant with the creation of a service level management document. Alternatively, a graph can be built to model an existing service level management document. The node panel 504 displays the optional nodes that are available to the user based upon the selected node in the viewable representation panel 502. If the user selects a node in the graphical representation panel 502, the node panel 504 will display all optional child node types that can be created for the selected node. The user can drag, click, double click or otherwise select a node in the node panel 504 to be added to the graph.

In the illustrative example, the user is building a graph to model a service level agreement. In this example, the graph must include a root node, so the root node 202 is automatically provided in the viewable representation panel 502. Moreover, in the illustrative example service level agreement, the Basic node 204A is a required node. As noted above with reference to FIG. 2 and FIG. 3, the example Basic node 204A includes two required leaf nodes. As such, the Basic node 204A is represented as a collapsed branch graph node. Since the user is just starting to create the graph, the Root node 202 and the Basic node 204A are each color coded with a red background color, indicating to the user that each node has a configuration page that includes required information that is not filled out.

Keeping with the current example, as noted in FIG. 2, the service level agreement may also optionally include several other branch node types, including an optional Contractual node, an optional Financial node, an optional Operational node and an optional Metrics node. As such, each of these node types is provided as options that the user may select to add to the graph. Alternatively, since these are optional, the user need not include them in a particular service level agreement being modeled (and hence, the user need not add these nodes to a corresponding graph, if not required).

The interface 500 is configured such that when a user moves a mouse pointer over a node in the viewable representation of the graph, the corresponding configuration page for the node pops up for user editing. Keeping with the current example, the user selects the root node 202, such as by mousing over the root node 202 in the viewable representation panel, and by clicking, double clicking or otherwise selecting the root node 202. Upon selecting the root node 202, the configuration page of the root node 202 is launched, e.g., in a pop-up window, allowing the user to enter (or modify/edit) the section of the underlying service level agreement that corresponds to the root node 202. An example is illustrated as the General sub-tab 420 under the Main tab 402 in FIG. 4. During graph creation in FIG. 5, the Contractual Section tab 404B, Financial Section tab 404C, Operational Section 404D and All metrics section tab 404E need not be displayed (because they are not part of the current graph). After the user is finished entering information into the General tab, the user can select the Contracts Navigator 424 to return to the interface 500 of FIG. 7.

In the current view, the nodes are each represented with indicia to indicate the status of each node. As an illustrative example, a color attribute can be set for each node in the graph based upon a status that corresponds to the status of information entered into the associated configuration page of the corresponding node. The color attribute is set to cause the node to display in a first color in the viewable representation of the node where the corresponding configuration page is incomplete, the color attribute is set to cause the node to display in a second color in the viewable representation of the node where the corresponding configuration page is complete and the color attribute is set to cause the node to display in a third color in the viewable representation of the node where the corresponding configuration page has been modified.

This allows the nodes to be color-coded where different background colors of nodes each represent a different status of the nodes. Moreover, the colors can be linked to different states of the graph, e.g., saved, submitted, created, or modified. In an illustrative example, if a graph has been saved, then if a node is linked to a configuration page that contains required information where not all of the required information is filled out, the background color of node is brown. Alternatively, if all required information of a node is filled out then the background color is green. If a graph has been submitted to the operating environment, then the color of all nodes is blue. If a user is actively creating a graph and some required info in one node is not filled out, the background color of current node is red. If all required information in a linked configuration page is filled out, then the background color of the current node is yellow. If a user is viewing a graph that has been modified, then a node that has not been modified has a white background color and nodes that have been modified have a yellow background color. Of course, the above-color codes are merely exemplary and other color combinations may alternatively be implemented.

Figure 8:
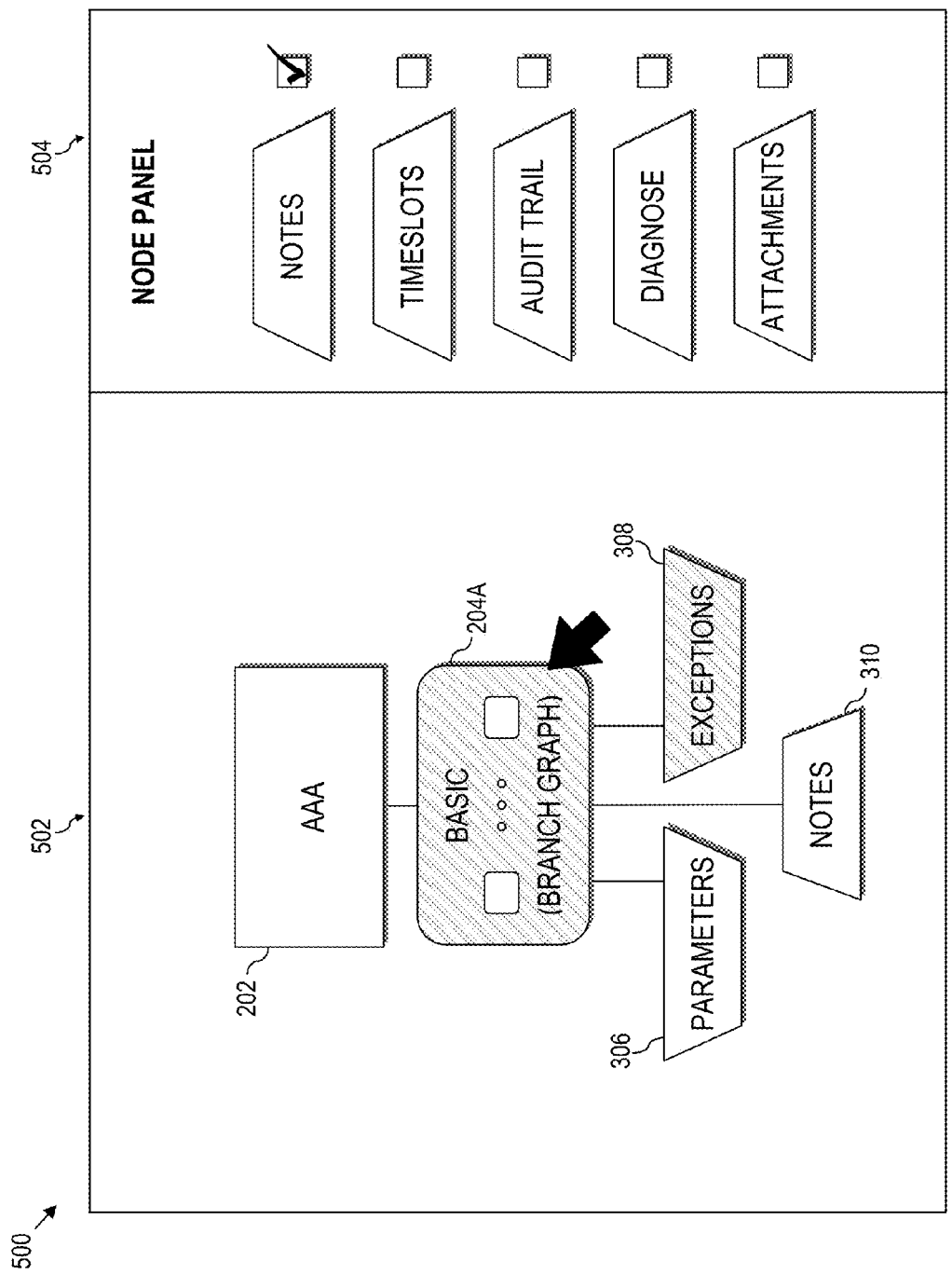
FIG. 8 is a graphical user interface for building a graph of a service level management document, according to further aspects of the present disclosure.

Referring to FIG. 8, the user has completed filling out the required information of the configuration page for the Root node 202. As such, the background color of the root node has changed, informing the user that the Root node 202 is complete. The user mouses over or otherwise selects the Basic node 204A. Upon selecting the Basic node 204A, the options in the node panel 504 change to reflect the optional leaf nodes associated with the given graph type (and corresponding type of service level management document—here a service level agreement). As illustrated, the Parameters leaf node 306 and the Exceptions leaf node 308 are each required, so those nodes are automatically presented in the viewable representation panel 502. Moreover, the user has selected the "notes" leaf node in the node panel 504. As such, a notes node 310 is added to the graph. By selecting any one of the displayed nodes, the linked configuration page is launched so that the user can enter the information for the service level agreement associated with the selected node, examples of which are set out in FIG. 5 and FIG. 6.

Figure 9:
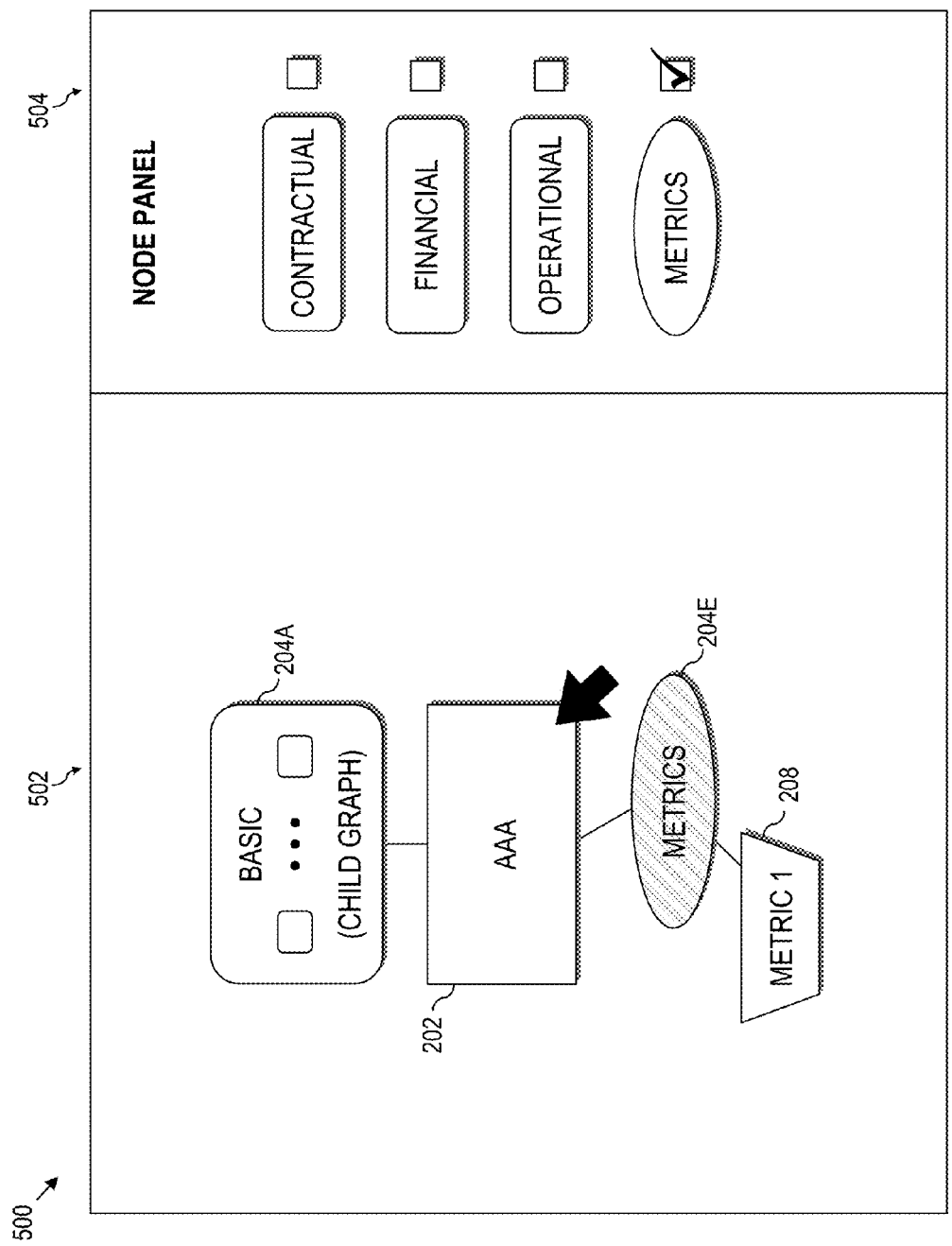
FIG. 9 is a graphical user interface for building a graph of a service level management document, according to still further aspects of the present disclosure.

Referring to FIG. 9, the user has finished entering all of the Basic node information required by the service level agreement to be modeled. As such, the user collapses the Basic node, e.g., by clicking or otherwise selecting the Basic node. The user has again selected the Root node 202. Now, the root node 202 and Basic node 204A have a background color indicating that all required information has been provided. Again, the node panel 504 changes to reflect the available optional nodes for the currently selected node, here, the Root node 202. In this example, the user selects the optional metrics node. The above process repeats until the user has sufficiently modeled the service level agreement.

Referring to FIG. 7-FIG. 9 generally, a graph can be used to create a modeled document. As such, the configuration page information filled in while (or after) creating the graph is the service level management document itself. Accordingly, there is no need to re-enter or re-type information about the document being modeled. Therefore, the document and the graph that models the document are tightly coupled. Additionally, each node added to the viewable representation panel 502 is graphically represented with a different predetermined shape designating the role of that node in the graph, e.g., root node, required branch node, required leaf node, optional branch node, optional leaf node, or branch graph node. In an illustrative example the viewable representation of the graph is configured so as to appear on a single display area, such as within the viewable representation panel 502. For instance, by providing a branch graph node type, even large and complex graphs can be collapsed down to a viewable representation that fits into a viewable display area. Moreover, by using different shapes for each node type, and by color-coding each shape, the user is immediately notified as to the status of the modeled service level management document.

According to further aspects herein, the interface 500 can automatically create branch graph nodes by identifying a group of two or more nodes that each depend from a particular branch node within the viewable representation of the graph, e.g., by identifying branch nodes or leaf nodes that are children of a particular node. The interface thus designates the particular node as a branch graph node and inserts the branch graph node into the viewable representation of the graph in place of the particular branch node and all nodes that ultimately depend from the particular node in the graph. In the illustrative example, the interface collapses all child nodes into the branch graph node. The branch graph node is given a particular shape to inform the user that there is at least one hierarchical level below the branch graph node. In practice, there can be any desired number of hierarchical levels that can be collapsed into a branch graph node.

According to still further aspects herein, a branch graph node need not be limited to a single branch node and its children. For instance, where it is difficult to describe all nodes in one screen, a user can select several nodes and collapse them to create one branch graph node. If the user double clicks the branch graph node, the interface will expand the branch graph and only display the relationship among the selected nodes, e.g., in the viewable area or alternatively, in a pop-up window.

Moreover, the interface 500 can be configured such that when a branch graph node is selected by the user, a new window is launched that displays a new viewable representation of the graph, including the particular branch node and at least each branch node one hierarchical step from the particular node, e.g., as illustrated in FIG. 3.

According to still further aspects, the interface 500 can include a means to delete or otherwise remove a node from a corresponding graph. For instance, the interface receives a command to select a node within the viewable representation for deletion, e.g., by right clicking on a node or otherwise indicating that a node should be deleted. The interface 500 removes the node from the viewable representation and the graph and removes all nodes that are hierarchically downstream from the node selected for deletion, e.g., where the node that is deleted is a branch graph node. This also deletes the corresponding configuration pages, and hence automatically modifies the underlying modeled document.

Still further, the interface 500 can commit a completed service level management document to an automated service level monitoring tool to monitor the service level agreement document according to the properties defined in the graph, as described in greater detail herein. Alternatively, versions can be stored, archived or otherwise preserved outside of the execution environment.

According to aspects herein, graph types may be stored as templates. In this regard, a user may select a graph template as a starting point. Each template may be associated with a different type of service level management document. In the current example, the graph template may include the Root node and Basic Node, corresponding to the two required configuration pages of a service level agreement or certain type of service level agreement, etc. Within the Basic node, the template would include the Parameters and Exceptions nodes as these nodes define required leaf nodes.

The user interface 500 allows a user to model a service level management document in a hierarchical manner. Moreover, the user can drive up and down various levels of the modeled document. Because of the top-down approach, a user cannot create a leaf node without first creating a branch node from which the leaf node extends. This prevents a modeled document from being fragmented, for instance. Moreover, if a user adds a node that includes required sub-nodes, then all required nodes below the node are also are added in the graph. Still further, a user can "scroll" through graphs and view representations of modeled documents in a fast and efficient manner.

As an alternative to the node panel 504, any other suitable approach can be provided to allow the user to add optional nodes. For instance, the user may be able to right click on a node to see and add optional nodes. This approach potentially allows for a larger viewable area for the graph. After the user creates a new node, a line is automatically drawn to connect the new node to its parent node.

As noted, the graph allows every node to represent a summary of one or several pages that collectively define the entirety of a modeled service level management document. Thus, a user can browse a whole contract in one screen. Moreover, the interface 500 can be implemented like a wizard with multi-paths. Thus, the user easily knows which page(s) need filled out first. Moreover, by clicking on the graph, the configuration page is opened that links to the direct content of a service level management document. Thus, a user can easily create and modify service level management documents themselves by navigating to the relevant portion of the document via the graph. Still further, it is now easy to delete content from a service level management document. Because a portion of the document is logically organized and represented by a graph node, by deleting that graph node, all of the corresponding service level management document information is correspondingly deleted (e.g., by deleting the corresponding configuration page data). Deleting a branch node deletes any children/leaf nodes that extend from the deleted branch node. Still further, because of the background color codes, a user readily knows which service level management documents are complete, incomplete, modified, committed, archived or versioned, etc.

Figure 10:
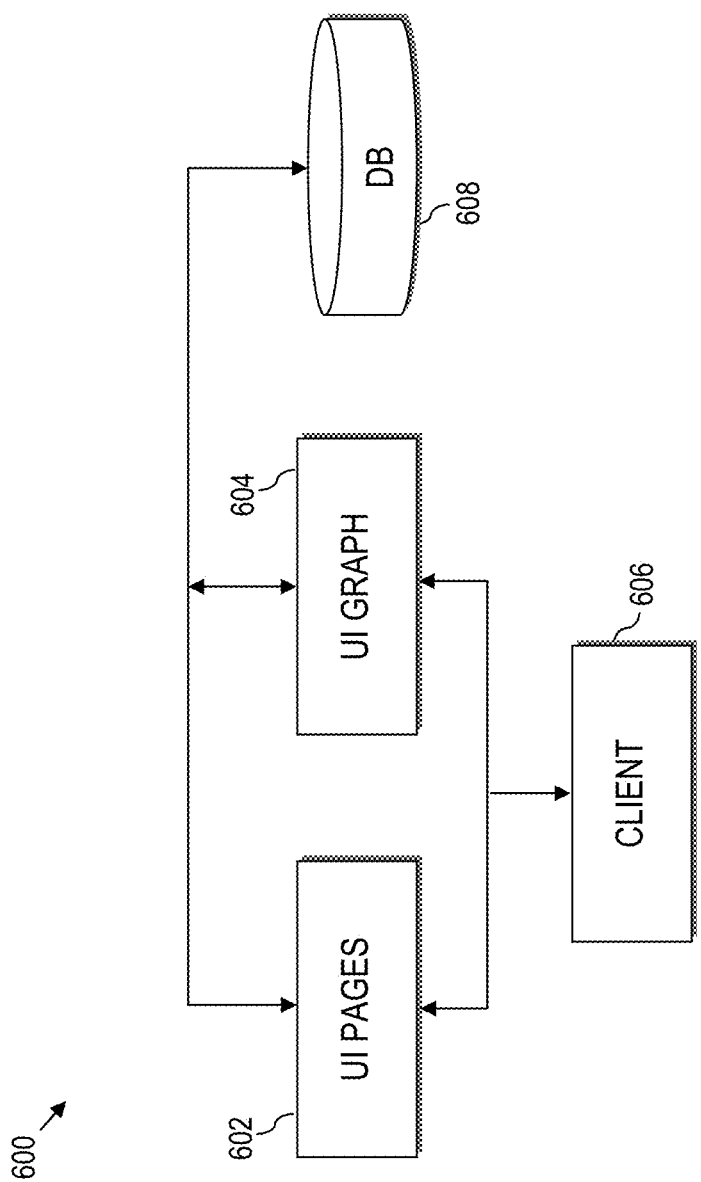
FIG. 10 is a schematic diagram of a computer system for executing aspects of any of FIG. 1-FIG. 9, according to various aspects of the present disclosure.

Referring to FIG. 10, a schematic diagram illustrates a computer system 600 for executing aspects of any of FIG. 1-FIG. 9, according to various aspects of the present disclosure. The system 600 includes a user interface configuration module 602 and user interface graph module 604 that are accessed through a client 606. The user interface configuration module 602 is utilized to provide access to the configuration pages that store the parts of the associated service level management documents, examples of which are set out in FIG. 4-FIG. 6. The user interface graph module 604 provides the interface to create graphs, as illustrated in FIG. 2 and FIG. 7-FIG. 9. The graph and corresponding configuration pages collectively define a service level management document model, and each model is stored in a database 608.

Figure 11:
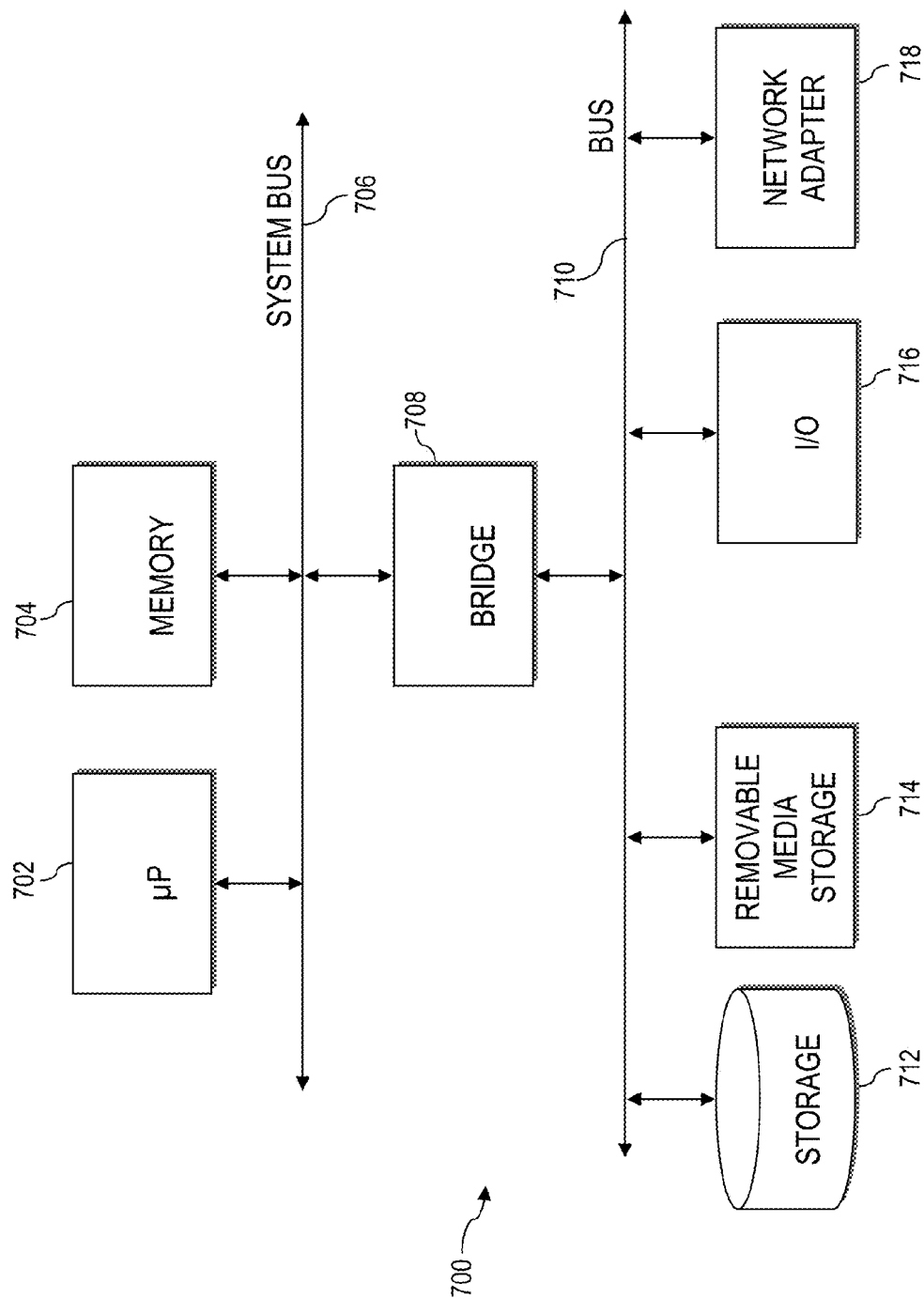
FIG. 11 is a schematic of a computer system comprising computer readable program code for executing any aspects described herein with regard to FIG. 1-FIG. 10, according to various aspects of the present disclosure.

Referring to FIG. 11, a schematic of an exemplary computer system having computer readable program code for executing any aspects described herein with regard to FIG. 1-FIG. 10 is illustrated. The computer system 700 includes one or more microprocessors 702 that are connected to memory 704 via a system bus 706. A bridge 708 connects the system bus 706 to an I/O Bus 710 that links peripheral devices to the microprocessor(s) 702. Peripherals may include storage 712, such as a hard drive, removable media storage 714, e.g., floppy, flash, CD and/or DVD drive, I/O device(s) 716 such as a keyboard, mouse, etc. and a network adapter 718. The memory 704, storage 712, removable media insertable into the removable media storage 714 or combinations thereof, can be used to implement the methods, configurations, interfaces and other aspects set out and described herein with regard to FIG. 1-FIG. 10.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, material s, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

What is claimed is:

1. A method of representing a service level management document comprising:
   receiving a request from a user to create a multi-path, navigable graph that represents a corresponding service level management document in a graphical user interface, the graphical user interface having:
      a viewable representation panel for displaying the navigable graph as at least one node; and
      a node panel for displaying candidate optional branch nodes that are available to the user for inclusion in the navigable graph;
   inserting a root node into the navigable graph within the viewable representation panel, the root node associated with a root node configuration page;
   automatically inserting a required node in response to inserting the root node, based on a document type of the root node, wherein the required node branches from the root node and is associated with a corresponding node configuration page;
   updating the node panel in the graphical user interface upon identifying a user-selected node of the navigable graph within the viewable representation panel, by:
      updating the content of the node panel with a list of each candidate optional branch node associated with the user-selected node;
   updating the navigable graph in response to a user-selected candidate optional branch node from the node panel by:
      inserting the selected optional branch node into the navigable graph as a branch of the user-selected node within the viewable representation panel, the optional branch node associated with a corresponding node configuration page; and
   setting node indicia to cause each node in the navigable graph that has a corresponding incomplete node configuration page to display a first indicator and each node in the navigable graph that has a corresponding complete configuration page to display a second indicator different from the first indicator in the viewable representation panel.

2. The method according to claim 1, further comprising:
   prompting the user to provide information required by the configuration page of a selected node.

3. The method of claim 1, further comprising:
   designating each node that does not have at least one child branch node as a leaf node;
   wherein inserting a node into the viewable representation of the navigable graph further comprises:
   inserting the root node comprising a first predetermined shape;
   inserting each branch node comprising a second predetermined shape; and
   inserting each leaf node comprising a third predetermined shape, where each of the first, second and third predetermined shapes are different.

4. The method according to claim 1, wherein setting node indicia further comprises:
   setting the first indicator to define a first color attribute that causes each associated node to display in a first color in the viewable representation panel where the corresponding configuration page is incomplete;
   setting the second indicator to define a second color attribute that causes each associated node to display in a second color in the viewable representation panel where the corresponding configuration page is complete; and
   setting a third indicator to define a third color attribute that causes each associated node to display in a third color in the viewable representation panel where the corresponding configuration page has been modified.

5. The method of claim 1, further comprising:
   configuring the graphical user interface such that when a user moves a mouse pointer over a node in the viewable representation of the navigable graph, the corresponding configuration page for the node pops up for user editing.

6. The method according to claim 1, further comprising:
   configuring the viewable representation of the navigable graph so as to appear on a single display area.

7. The method according to claim 6, further comprising:
   identifying a group of two or more nodes that each depend from a particular branch node within the viewable representation of the navigable graph;
   designating the particular node as a branch graph node;
   inserting the branch graph node into the viewable representation of the navigable graph in place of the particular branch node and all nodes that ultimately depend from the particular node in the navigable graph; and
   configuring the branch graph node such that when selected by the user, a new window is launched that displays a new viewable representation of the navigable graph, comprising the particular branch node and at least each branch node one hierarchical step from the particular node.

8. The method according to claim 1, further comprising:
   receiving a command to select a node within the viewable representation for deletion;
   removing the node from the viewable representation and the navigable graph; and
   removing all nodes that are hierarchically downstream from the node selected for deletion.

9. The method according to claim 1, further comprising committing a completed service level management document to an automated service level monitoring tool to monitor the service level agreement document according to the properties defined in the graph nodes.

10. The method of claim 1, wherein setting node indicia further comprises:
    determining that a node in the navigable graph has a corresponding incomplete node configuration page where required information of the corresponding node configuration page is missing; and
    determining that a node in the navigable graph has a corresponding complete node configuration page where required information of the corresponding node configuration page is complete.

11. Computer readable hardware comprising:
    a processor;
    a computer program product stored on a computer readable storage medium comprising computer readable program code, the computer readable program code, when read out and executed by the processor, represents a service level management document as a graph, comprising:
    computer readable program code to receive a request from a user to create a multi-path, navigable graph that represents a corresponding service level management document in a graphical user interface, the graphical user interface having:
    a viewable representation panel for displaying the navigable graph as at least one node; and a node panel for displaying candidate optional branch nodes that are available to the user for inclusion in the navigable graph;

computer readable program code to insert a root node into the navigable graph within the viewable representation panel the root node associated with a root node configuration page;

computer readable program code to automatically insert a required node in response to inserting the root node, based on a document type of the root node, wherein the required node branches from the root node and is associated with a corresponding node configuration page;

computer readable program code to update the node panel in the graphical user interface when a user selects a node of the navigable graph within the viewable representation panel, the computer readable program code executable, to:

update the content of the node panel with a list of each candidate optional branch node associated with the user-selected node;

computer readable program code to update the navigable graph in response to a user-selected candidate optional branch node from the node panel the computer readable program code executable to:

insert the selected optional branch node into the navigable graph as a branch of the user-selected node within the viewable representation panel, the optional branch node configuration page; and computer readable program code to set node indicia to cause each node in the navigable graph that has a corresponding incomplete node configuration page to display a first indicator and each node in the navigable graph that has a corresponding complete configuration page to display a second indicator different from the first indicator in the viewable representation panel.

12. The computer readable hardware according to claim 11, further comprising computer readable program code to: prompt the user to provide information required by the configuration page of a selected node.

13. The computer readable hardware of claim 12, further comprising computer readable program code to designate each node that does not have at least one child branch node as a leaf node;

wherein the computer readable program code to insert a node into the viewable representation of the navigable graph further comprises computer readable program code to:

insert the root node comprising a first predetermined shape;

insert each branch node comprising a second predetermined shape; and insert each leaf node comprising a third predetermined shape, where each of the first, second and third predetermined shapes are different.

14. The computer readable hardware according to claim 11, wherein the computer readable program code to set node indicia further comprises computer readable program code to set node indicia such that:

the first indicator is defined as first color attribute that is set to cause each associated node to display in a first color in the viewable representation panel where the corresponding configuration page is incomplete;

the second indicator is defined as a second color attribute that is set to cause each associated node to display in a second color in the viewable representation panel where the corresponding configuration page is complete; and a third indicator that is defined as a third color attribute that is set to cause each associated node to display in a third color in the viewable representation panel where the corresponding configuration page has been modified.

15. The computer readable hardware of claim 11, further comprising computer readable program code to:

configure the graphical user interface such that when a user moves a mouse pointer over a node in the viewable representation of the navigable graph, the corresponding configuration page for the node pops up for user editing.

16. The computer readable hardware according to claim 11, further comprising computer readable program code to:

configure the viewable representation of the navigable graph so as to appear on a single display area.

17. The computer readable hardware according to claim 11, further comprising computer readable program code to:

identify a group of two or more nodes that each depend from a particular branch node within the viewable representation of the navigable graph;

designate the particular node as a branch graph node;

insert the branch graph node into the viewable representation of the navigable graph in place of the particular branch node and all nodes that ultimately depend from the particular node in the navigable graph; and configure the branch graph node such that when selected by the user, a new window is launched that displays a new viewable representation of the navigable graph, comprising the particular branch node and at least each branch node one hierarchical step from the particular node.

18. The computer readable hardware according to claim 11, further comprising computer readable program code to:

receive a command to select a node within the viewable representation for deletion;

remove the node from the viewable representation and the navigable graph; and remove all nodes that are hierarchically downstream from the node selected for deletion.

19. The computer readable hardware according to claim 11, further comprising computer readable program code to:

commit a completed service level management document to an automated service level monitoring tool to monitor the service level agreement document according to the properties defined in the graph nodes.

20. The computer readable hardware according to claim 11, wherein the computer readable program code to set node indicia further comprises computer readable program code to:

determine that a node in the navigable graph has a corresponding incomplete node configuration page where required information of the corresponding node configuration page is missing; and determine that a node in the navigable graph has a corresponding complete node configuration page where required information of the corresponding node configuration page is complete.

21. A system comprising:

a microprocessor coupled to a memory, wherein the microprocessor is programmed to represent a service level management document as a graph by executing program code stored in the memory to:

receive a request from a user to create a multi-path, navigable graph that represents a corresponding service level management document in a graphical user interface, the graphical user interface having:
a viewable representation panel for displaying the navigable graph as at least one node; and
a node panel for displaying candidate optional branch nodes that are available to the user for inclusion in the navigable graph;
insert a root node into the navigable graph within the viewable representation panel, the root node associated with a root node configuration page;
insert automatically, a required node in response to inserting the root node, based on a document type of the root node, wherein the required node branches from the root node and is associated with a corresponding node configuration page;
update the root node panel in the graphical user interface upon identify a user-selected node of the navigable graph within the viewable representation panel, by executing program code to:
update the content of the node panel with a list of each candidate optional branch node associated with the user-selected node;
update the navigable graph in response to a user-selected candidate optional branch node from the node panel by executing program code to:
insert the selected optional branch node into the navigable graph as a branch of the user-selected node within the viewable representation of the navigable graph, the optional branch node associated with a corresponding node configuration page; and
set node indicia to cause each node in the navigable graph that has a corresponding incomplete node configuration page to display a first indicator and each node in the navigable graph that has a corresponding complete configuration page to display a second indicator different from the first indicator in the viewable representation panel.

22. The system according to claim 21, further comprising a module configured to:
prompt the user to provide information required by the configuration page of a selected node.

23. The system according to claim 22, further comprising a module configured to:
designate each node that does not have at least one child branch node as a leaf node;
wherein the module configured to insert a node into the viewable representation of the navigable graph is further configured to:
insert the root node comprising a first predetermined shape;
insert each branch node comprising a second predetermined shape; and
insert each leaf node comprising a third predetermined shape, where each of the first, second and third predetermined shapes are different.

24. The system according to claim 21, wherein the processor executes program code to set node indicia by executing program code to:
set the first indicator to define a color attribute that causes each associated node to display in a first color in the viewable representation panel where the corresponding configuration page is incomplete;
set the second indicia to define a color attribute that causes each corresponding node to display in a second color in the viewable representation panel where the corresponding configuration page is complete; and
set a third indicia to define a color attribute that causes each associated node to display in a third color in the viewable representation panel where the corresponding configuration page has been modified.

25. The system according to claim 21, further comprising a module configured to:
configure the graphical user interface such that when a user moves a mouse pointer over a node in the viewable representation of the navigable graph, the corresponding configuration page for the node pops up for user editing.

26. The system according to claim 21, further comprising a module configured to:
configure the viewable representation of the navigable graph so as to appear on a single display area.

27. The system according to claim 21, further comprising a module configured to:
identify a group of two or more nodes that each depend from a particular branch node within the viewable representation of the navigable graph;
designate the particular node as a branch graph node;
insert the branch graph node into the viewable representation of the navigable graph in place of the particular branch node and all nodes that ultimately depend from the particular node in the navigable graph; and
configure the branch graph node such that when selected by the user, a new window is launched that displays a new viewable representation of the navigable graph, comprising the particular branch node and at least each branch node one hierarchical step from the particular node.

28. The system according to claim 21 further comprising a module configured to:
receive a command to select a node within the viewable representation for deletion;
remove the node from the viewable representation and the navigable graph; and
remove all nodes that are hierarchically downstream from the node selected for deletion.

29. The system according to claim 21, further comprising a module configured to:
commit a completed service level management document to an automated service level monitoring tool to monitor the service level agreement document according to the properties defined in the graph nodes.

30. The system according to claim 21, wherein the processor executes program code stored in the memory further to:
determine that a node in the navigable graph has a corresponding incomplete node configuration page where required information of the corresponding node configuration page is missing; and
determine that a node in the navigable graph has a corresponding complete node configuration page where required information of the corresponding node configuration page is complete.

* * * * *